United States Patent [19]
Thomas

[11] Patent Number: 4,759,301
[45] Date of Patent: Jul. 26, 1988

[54] SEED DRILL

[75] Inventor: Charles J. Thomas, Hillarys, Australia

[73] Assignee: John David Thomas, Geraldton, Australia

[21] Appl. No.: 751,188

[22] Filed: Jul. 2, 1985

[30] Foreign Application Priority Data

Jul. 4, 1984 [AU] Australia ............................ PG5850

[51] Int. Cl.⁴ ................................................. A01C 5/06
[52] U.S. Cl. ......................................... 111/85; 111/86; 172/709; 172/710; 172/776
[58] Field of Search ....................... 111/85, 86, 52, 80, 111/73, 84, 7; 172/705, 709, 710, 776, 142, 189, 193, 194, 265, 654, 657; 403/53, 57, 59, 69–71, 111, 146, 161

[56] References Cited

U.S. PATENT DOCUMENTS

| | | | |
|---|---|---|---|
| 446,978 | 2/1891 | Orr | 111/65 |
| 465,081 | 12/1891 | Wood | 111/85 |
| 1,386,336 | 8/1921 | Hoftrup | 172/709 |
| 2,777,379 | 1/1957 | Heath | 172/657 |
| 3,213,947 | 10/1965 | MacKenzie | 172/776 |
| 3,490,544 | 1/1970 | Godbersen | 172/705 |
| 4,037,545 | 7/1977 | Dreyer | 111/85 |
| 4,244,306 | 1/1981 | Peterson et al. | 111/52 |
| 4,417,530 | 11/1983 | Kopecky | 111/73 |
| 4,493,273 | 1/1985 | Ganchet et al. | 111/86 |
| 4,528,920 | 7/1985 | Neumoyer | 111/85 |
| 4,532,790 | 8/1985 | Nicholls | 172/705 |
| 4,694,759 | 9/1987 | Dreyer et al. | 172/709 X |

FOREIGN PATENT DOCUMENTS

| | | | |
|---|---|---|---|
| 28080 | 7/1931 | Australia | 172/705 |
| 106467 | 2/1939 | Australia | 172/264 |
| 161957 | 5/1952 | Australia | 172/705 |
| 434865 | 7/1970 | Australia | 111/86 |
| 81742 | 1/1982 | European Pat. Off. | 172/705 |
| 445173 | 2/1926 | Fed. Rep. of Germany | 172/657 |
| 41991 | 5/1933 | France | 172/710 |
| 53160 | 12/1922 | Sweden | 172/657 |
| 349384 | 5/1931 | United Kingdom | 172/654 |
| 967244 | 8/1964 | United Kingdom | 111/86 |
| 1046002 | 10/1966 | United Kingdom | 111/86 |
| 1076665 | 7/1967 | United Kingdom | 111/86 |
| 1399981 | 7/1975 | United Kingdom | 111/86 |
| 2043419 | 10/1980 | United Kingdom | 111/86 |
| 2077081 | 12/1981 | United Kingdom | 111/86 |
| 2144012 | 2/1985 | United Kingdom | 111/86 |
| 2161053 | 1/1986 | United Kingdom | 111/86 |
| 934953 | 10/1980 | U.S.S.R. | 111/86 |
| 858604 | 8/1981 | U.S.S.R. | 111/70 |

Primary Examiner—James R. Feyrer
Attorney, Agent, or Firm—Harness, Dickey & Pierce

[57] ABSTRACT

A seed drill which will allow seed to be planted at a substantially constant depth regardless of contours and irregularities in the ground surface. The said drill has a tyne pivotally mounted on a frame for angular movement about a substantially horizontal axis transverse to the direction of travel. The lower end of the tyne being adapted to support a ground engaging tool with a seeding boot located rearwardly of the tool whereby the tool is arranged to form a furrow in the ground for seed discharging from the seeding boot. A spring biassing means acts between the tyne and frame for urging the tool into engagement with the ground. The spring biassing means is arranged to exert a biassing force on the tyne for counteracting the resistive force exerted on the tool as the tool traverses the soil whereby to maintain the tool at a substantially constant working depth in the soil.

7 Claims, 5 Drawing Sheets

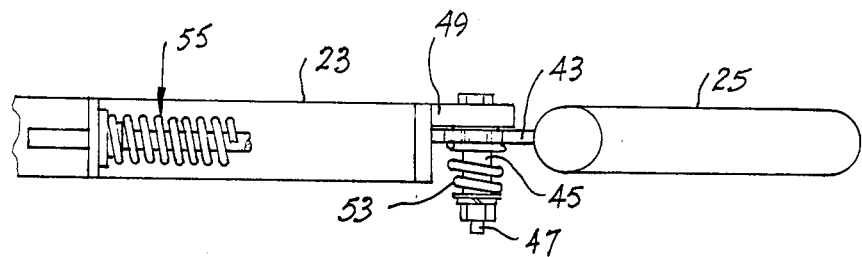
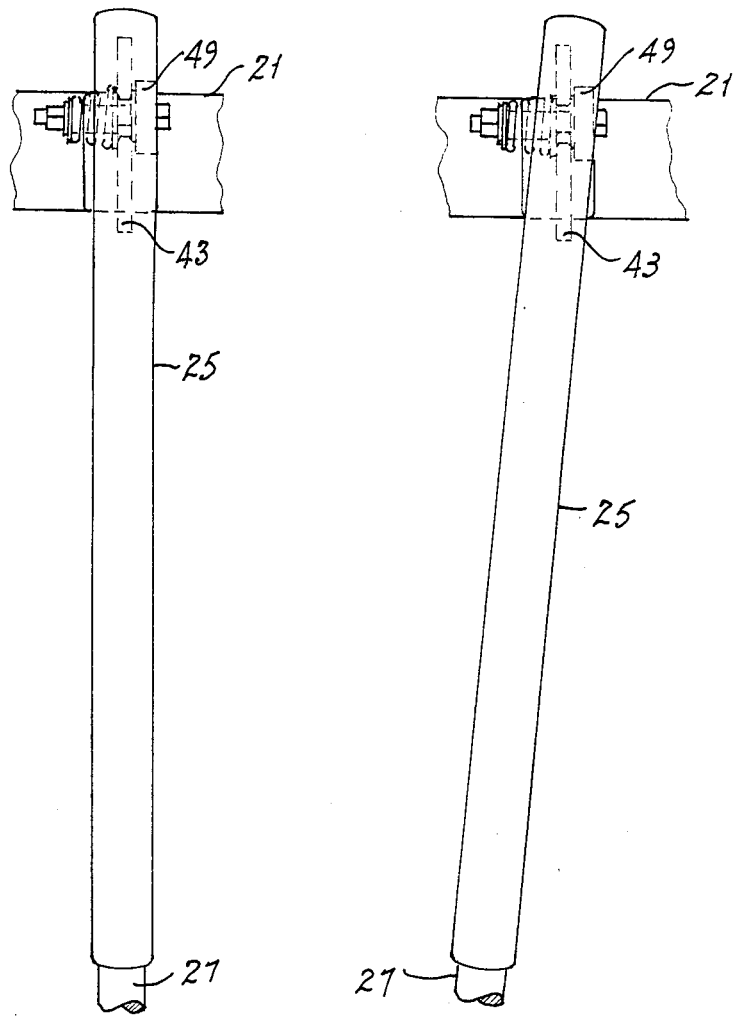

SEED DRILL

This invention relates to seed drills.

To assist in seed germination and subsequent plant development, it is desirable for seeds to be sown at a certain depth. There is, however, a difficulty in sowing seeds at an optimum depth owing to contours and other irregularities in the ground surface.

There have been various proposals for controlling the depth at which seeds are sown so as to accommodate changes in ground level. One proposal involves the use of the wheel attached to a seeding machine for the purpose of detecting changes in ground level so that the level of the machine relative to the ground may be adjusted accordingly. Another proposal involves the use of sonic radiation to detect changes in ground level. With both of these proposals, the point at which ground level is detected is remote from many, if not all, of the seeding boots from which seed is deposited into furrows in the ground. This has the disadvantage that while the sowing depth may be satisfactory at the location of one seeding boot, it may well be unsatisfactory at the various locations of other seeding boots on the machine, owing to irregularities in the ground surface. This problem is not evident in the seeder attachment disclosed in Australian Pat. No. 434865. In that arrangement, a seed boot is mounted at the lower end of a tubular tyne which is pivotally mounted at its upper end for rotation about a substantially horizontal axis transverse to the direction of travel of the seeding machine. The underside of the boot is provided with a downwardly projecting point for digging a furrow in the ground. A tension spring acts on the tyne to provide the tyne with a stump jump action. Seed is deposited in the furrow via the tubular tyne and a covering plate pivotally mounted on the boot is arranged to trail along the ground behind the tyne so as to move soil over the seeds. The covering plate is mounted in such a way that the upper movement thereof is limited. This enables the covering plate to act as a float on the surface of the soil so that the penetration of the downwardly projecting point is limited to determine the depth of the furrow. While this arrangement permits seed to be planted at a substantially uniform depth, it has not proved altogether satisfactory owing to the fact that because the depth of the furrow is determined by the covering plate, the seeding depth cannot be selectively varied.

It is an object of this invention to provide a seed drill which will allow seeds to be planted at a substantially constant depth regardless of contours or other irregularities in the ground surface, It is a further but only preferred object of this invention to provide a seed drill which will allow the seeding depth to be selectively varied.

In one form the invention resides in a seed drill comprising a tyne pivotally mounted on a frame for angular movement about a substantially horizontal axis tranverse to the direction of travel, the lower end of the tyne being adapted to support a ground engaging tool with a seeding boot located rearwardly of the tool whereby the tool is arranged to form a furrow in the ground for seed discharging from the seeding boot, and spring biassing means acting between the tyne and frame for urging the tool into engagement with the ground, the spring biassing means being arranged to exert a biassing force on the tyne for counteracting the resistive force exerted on the tool as the tool traverses the soil.

The furrow formed in the ground by the tool is of a substantially constant depth. The depth is controlled by a counteraction between the biassing force exerted on the tyne by the spring biassing means and the resistive force exerted on the tool by the soil as the tool passes through the soil. If the tool rises relative to the ground surface so as to form a furrow which is too shallow, the resistive force on the tool decreases and is exceeded by the biassing force on the tyne. The resultant force on the tyne restores the tool to a position corresponding to the desired depth of the furrow. Likewise, if the tool falls relative to the ground surface so as to form a furrow which is too deep, the resistive force on the tool increases and exceeds the biassing force on the tyne with the result that the tool is subsequently restored to the correct position.

Preferably, the spring biasing means comprises a compression spring assembly acting between the tyne and the frame and so arranged as to undergo compression on angular movement of the tyne in the rearward and upward direction.

Preferably, the spring biassing means is provided with an adjusting means for varying the biassing force exerted on the tyne at any particular angular position of the tyne.

In another form the invention resides in a seed drill comprising a tyne pivotally mounted on a frame for angular movement about a substantially horizontal axis transverse to the direction of travel, the lower end of the tyne being adapted to support a ground engaging tool with a seeding boot located rearwardly of the tool whereby the tool is arranged to form a furrow in the ground for seed discharging from the seeding boot, and spring biassing means acting between the frame and the tyne for urging the tool into engagement with the ground, wherein the spring biassing means comprises a push rod mounted on the frame for substantially axial sliding movement, the push rod being pivotally connected at one end thereof to the tyne, and a compression spring located on the push rod and acting between the frame and a stop on the push rod.

Preferably the stop on the push rod is adjustable along part of the length of the push rod.

In still another form the invention resides in a seed drill attachment adapted to be attached to an agricultural machine, comprising a frame, a tyne pivotally mounted on the frame for angular movement about a substantially horizontal axis transversed to the direction of travel, the lower end of the tyne being adapted to support a ground engaging tool with a seeding boot located rearwardly of the tool whereby the tool is arranged to form a furrow in the ground for seed discharging from the seeding boot, a spring biassing means acting between the tyne and the frame for urging the tool into engagement with the ground, and a drawbar mounted at one end on the frame and being adapted at the other end for attachment to the agricultural machine, the drawbar including first and second sections mounted for limited axial movement relative to each other.

The provision for limited axial movement between the first and second sections of the drawbar allows for limited rearward movement of the agricultural machine relative to the seed drill attachment when the combination of the agricultural machine and the seed drill attachment comes to a stop. This is advantageous in circumstances where the agricultural machine is a cultivator having tynes which are spring loaded for stump jump action. In such a case, the spring-loaded tynes are invariably deflected rearwardly to some extent when the machine stops. The spring force on the tynes is generally sufficient to draw the machine rearwardly so as to release at least part of that force. The action of the drawbar permits this rearward movement of the machine without transmitting it to the seed drill attachment. Rearward movement of the seed drill attachment is undesirable because it may cause soil to be forced up into the outlet end of the seed boot and result in a blockage.

Preferably the first section of the drawbar comprises an elongated member and the second section comprises a sleeve mounted on the elongated member for sliding movement therealong.

Preferably, a cushioning means is provided for cushioning relative movement between the first and second sections of the drawbar in the direction which corresponds to relative movement of the agricultural machine towards the seed drill attachment. The cushioning means may comprise a helical compression spring located about the elongated member, with one end of the compression spring acting on a stop on the elongated member and the other end acting on the sleeve.

Preferably the spring biassing means comprises a push rod mounted on the frame for substantially axial sliding movement, the push rod being pivotally connected at one end thereof to the tyne, and a compression spring located on the push rod and acting between the frame and a stop on the push rod.

Preferably the stop on the push rod is adjusted along part of the length of the push rod.

In still another form the invention resides in a seeding machine comprising a first frame onto which are mounted a plurality of first tynes which are spring loaded for stump jump action, a second frame rearward of the first frame, a plurality of second tynes each pivotally mounted on the second frame for angular movement about a substantially horizontal axis transverse to the direction of travel, the lower end of each second tyne being adapted to support a ground engaging tool with a seeding boot located rearwardly of the tool whereby the tool is arranged to form a furrow in the ground for seed discharging from the seeding boot, a respective spring biassing means acting between the second frame and each second tyne for urging the ground engaging tool into engagement with the ground, and a drawbar connecting the first and second frames, the drawbar including first and second sections mounted for limited axial movement relative to each other.

Preferably each spring biassing means comprises a push rod mounted on the second frame for substantially axial sliding movement, the push rod being pivotally connected at one end thereof to the tyne, and a compression spring located on the push rod and acting between the frame and a stop on the push rod.

The invention will be better understood by reference to the following description of one specific embodiment thereof as shown in the accompanying drawings in which:

FIG. 3 is a fragmentary plan view of the seed drill attachment with a portion of the spring biassing means omitted;

FIG. 4 is a fragmentary rear elevational view of the seed drill attachment with the tyne shown in a normal upright condition;

FIG. 5 is a view similar to that of FIG. 4 with the exception that the tyne is shown in a laterally deflected condition;

The embodiment is directed to a seed drill attachment 11 which is adapted to be attached to an agricultural machine 13 in the form of a cultivator having tynes 15 which are mounted for stump jump action. THe cultivator includes a mounting bar 17 which forms part of the frame of the cultivator and which is disposed transverse to the direction of travel of the cultivator. The tynes 15 are mounted at their upper ends on the mounting bar 17 and have ground working points (not shown) mounted on their lower ends.

Figure 1:
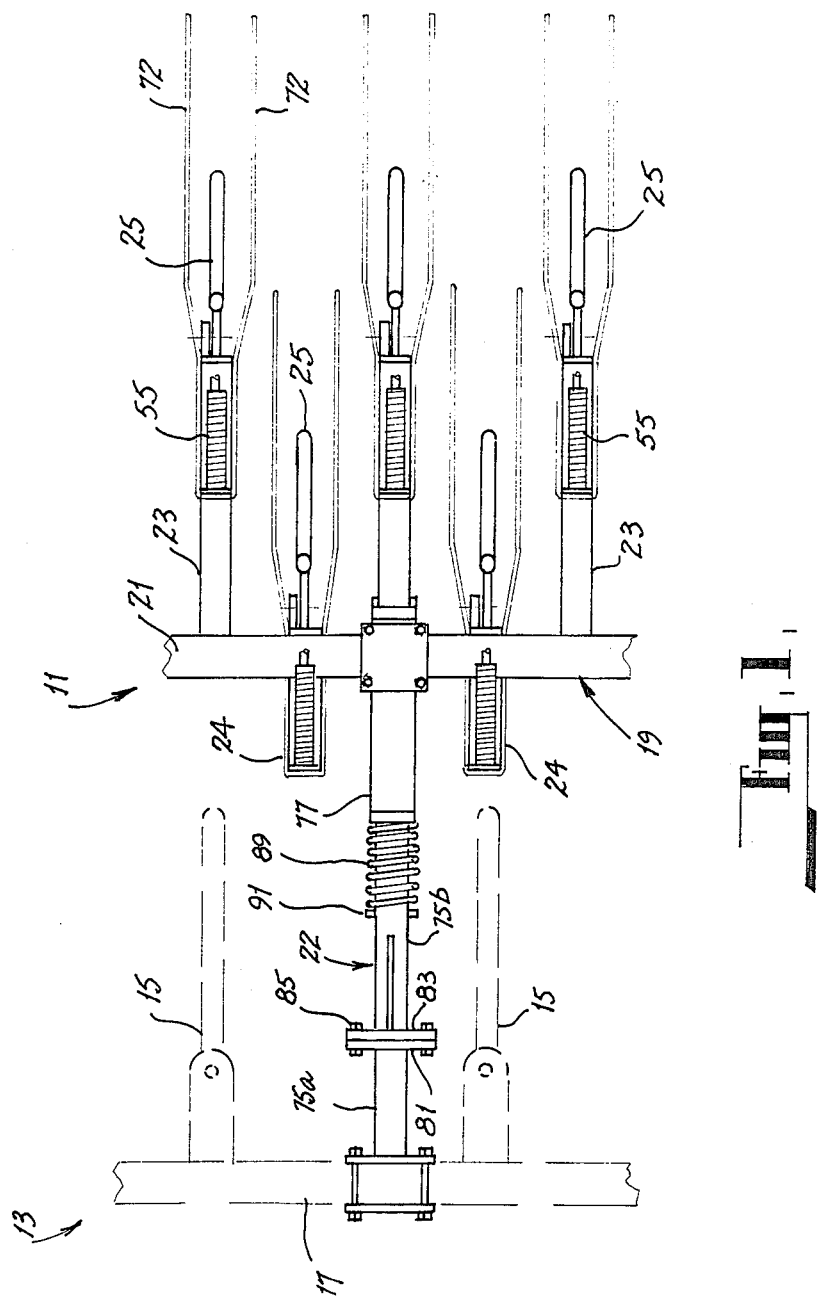
FIG. 1 is a fragmentary plan view of a seed drill attachment according to the embodiment attached to an agricultural machine.

The seed drill attachment 11 comprises a frame 19 having a mounting bar 21 transverse to the direction of travel. A plurality of spaced drawbars 22 (only one of which appears in the drawings) are each mounted at one end on the mounting bar 21 and adapted for attachment at its other end to the mounting bar 17 of the agricultural machine. The drawbars 22 are spaced along the length of the two mounting bars 17 and 21. The mounting bar 21 carries a pluality of spaced rearwardly directed mounting arms 23 and a plurality of spaced forwardly directed mounting arms 24 which are offset with respect to the rearwardly directed mounting arms, as shown in FIG. 1 of the drawings.

A tyne 25 is pivotally mounted onto each mounting arm 23, 24 for angular movement about a substantially horizontal axis transverse to the direction of travel. The lower end of each tyne 25 is adapted to support a ground engaging tool 27 with a seeding boot 29 located rearwardly of the ground engaging tool whereby the tool is arranged to form a furrow in the ground for seed discharging from the seeding boot. The ground engaging tool 27 comprises a downwardly and forwardly projecting point 31 and a shank 33 which is adapted to be received in a socket 35 formed in the lower end of the tool and releasably retained therein by means of a mounting bolt 37. The seeding boot 29 is detachably mounted onto the ground engaging tool 27 by means of a bolt 39. A seed delivery conduit 41 mounted onto the rear of the tyne 25 is arranged to deliver seed to the seeding boot 29.

Figure 8:
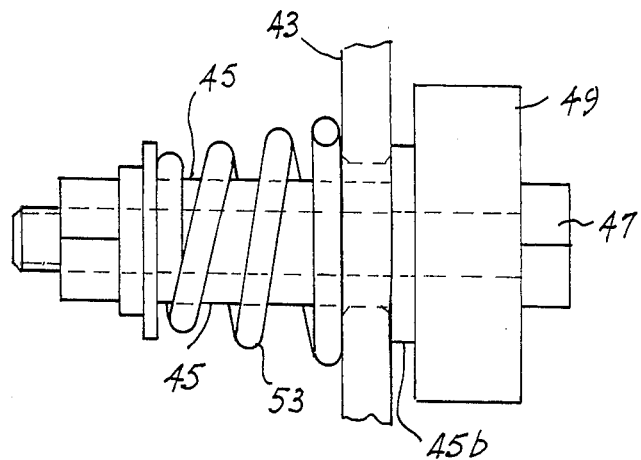
FIG. 8 is a fragmentary elevational view of a pivotal connection between a part of the frame of the seed drill attachment and a tyne.
Figure 9:
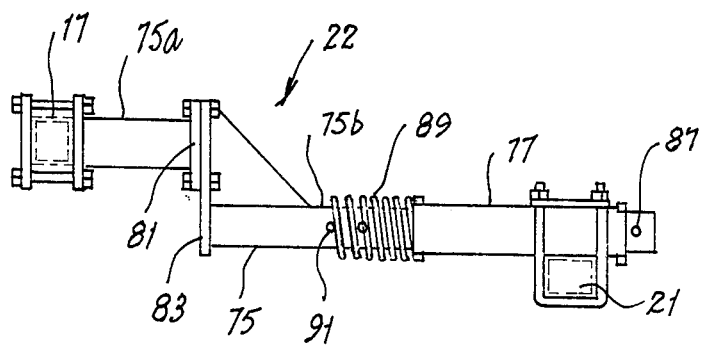
FIG. 9 is a side elevational view of a drawbar of the seed drill attachment.

Each tyne 25 is provided at its upper end with a forwardly projecting plate 43 which is pivotally mounted on a sleeve 45 located on a bolt 47 which is supported on a bracket 49 extending from the mounting arm 23, 24. The sleeve 45 has a shank 45a and a head 45b (FIG. 8). The mounting plate 43 includes a mounting aperture 51 into which the shank 45a of the sleeve is received. The shank 45a of the sleeve is a loose fit in the mounting aperture 51. A coiled compression spring 53 is positioned on the shank of the sleeve to keep the mounting plate 43 in contact with the head 45b. By virtue of the loose fit of the shank 45a of the sleeve in the mounting aperture 51 of the mounting plate, the tyne is capable of limited lateral sideways movement from a normal position (as shown in FIG. 4) to a deflected position (as shown in FIG. 5) to allow it to pass over any obstruction during its tranverse over the ground. The tyne is subsequently returned to its normal position under the action of the coiled compression spring.

Figure 2:
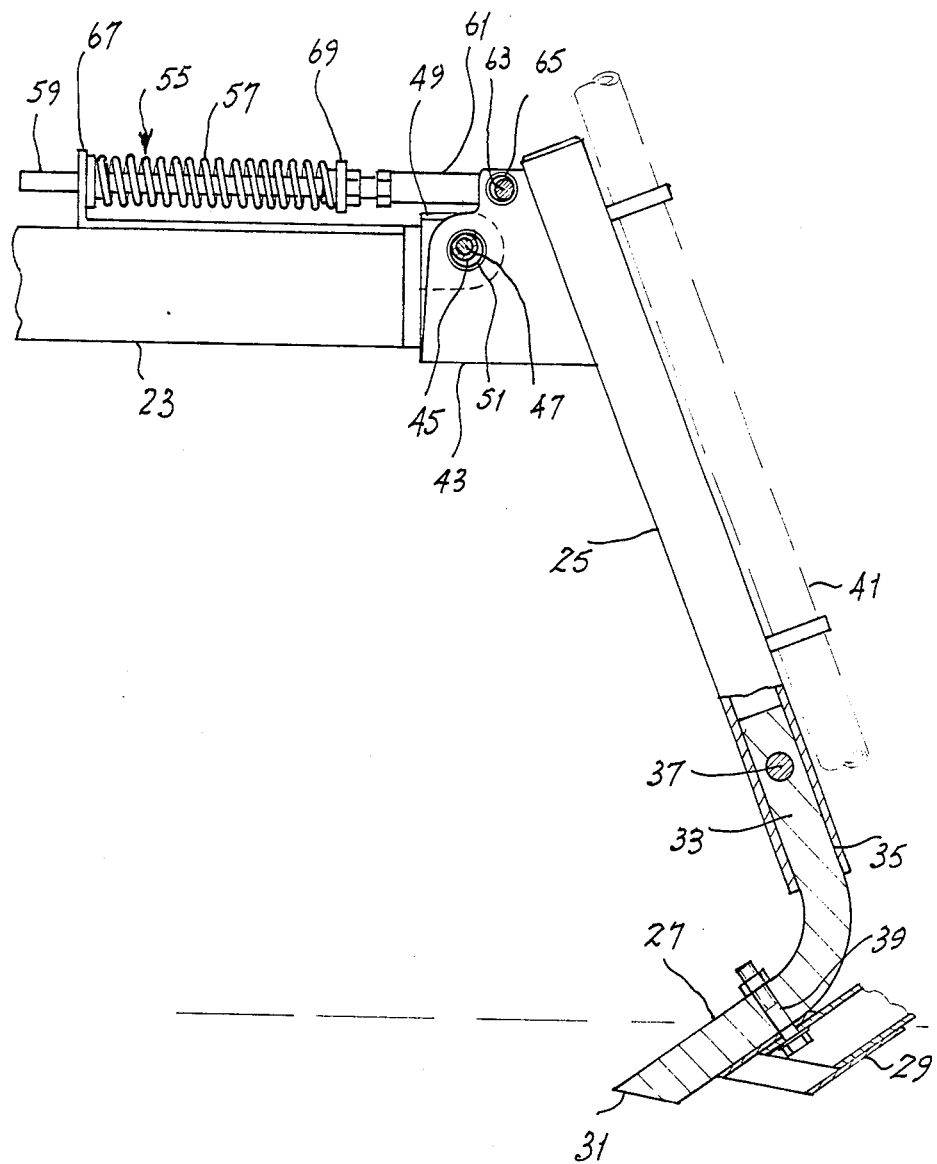
FIG. 2 is a fragmentary side elevational view of the seed drill attachment.
Figure 6:
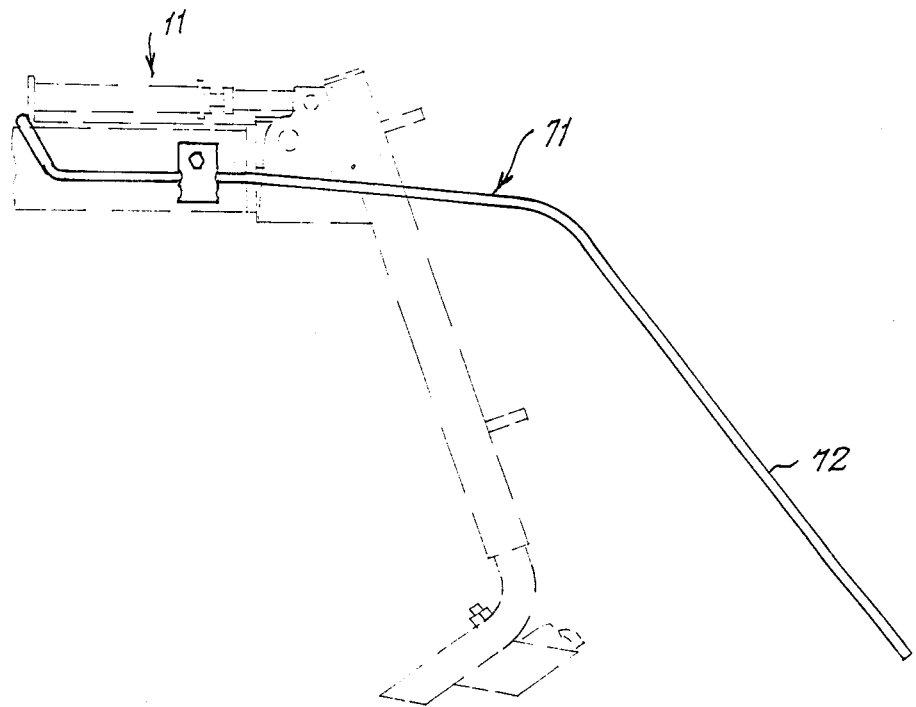
FIG. 6 is a side elevational view of a harrow mounted on the seed drill attachment.
Figure 7:
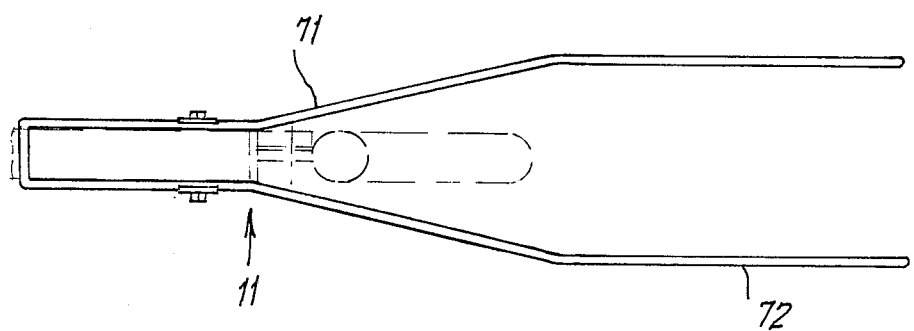
FIG. 7 is a plan view of the harrow of FIG. 6.

A spring biassing means 55 acts between each tyne and its respective mounting bar 23, 24 so as to exert a biassing force on the tyne which serves to maintain the ground engaging tool 27 in engagement with the ground. The spring biassing means 55 comprises a helical compression spring 57 located on a push rod 59. One end of the guide rod 59 is attached to the mounting plate 43 on the tyne by means of a yoke 61 which supports a pin 63. The mounting plate 43 is located between the arms of the yoke with the pin 63 received in an aperture 65 in the mounting plate at a location in close proximity to the pivot axis of the tyne 25. The pin 63 is a loose fit in the aperture 65 so as to accommodate the limited lateral sideways movement of the tyne as described hereinbefore. The push rod 59 is slidably received in an aperture (not shown) in an upstanding lug 67 on the mounting arm. The helical compression spring 57 acts between the lug 67 and an adjustable stop 69 positioned on the push rod 59 (as best seen in FIG. 2 of the drawings). The stop 69 is adjustable axially on the push rod to facilitate adjustment of the biassing force provided by the spring.

The spring means 55 provides a biassing force on the tyne which urges the tool 27 mounted at the lower end of the tyne into engagement with the ground so as to form a furrow therein. The biassing force on the tyne is counteracted by a resistive force on the tool 27 as it passes through soil previously worked by the ground working points on the tynes 15 of the cultivator. Because the ground working tool 27 pass through soil which has been worked, the resistive forces on the tool is essentially proportional to the working depth of the tool. In this way, the working depth of the tool 27 is determined by the biassing force exerted on its respective tyne 25 by the spring biassing means 55. Because the point at which the spring biassing means acts on the tyne 25 is in close proximity to pivot axis of the tyne, the extent of compression and extension of the compression spring 57 is small in relation to any movement of the ground engaging tool 31. This facilitates accurate adjustment of the biassing force on the tyne through adjustment of the position of the stop 69.

A harrow tyne 71 is mounted on each mounting arm 23, 24 for the purpose of covering the seed deposited in the furrows with soil. Each harrow tyne 71 includes a pair of rearwardly and downwardly directed tyne elements 72 which trail over the ground surface and displace soil into the furrows.

Each drawbar 22 includes an elongated member 75 and a sleeve member 77 which is mounted on the elongated member for limited sliding movement therealong. The elongated member 75 is adapted for attachment at its leading end to the mounting bar 17 of the agricultural machine, and the sleeve member 77 is adapted for attachment to the mounting bar 21 of the seed drill attachment 11.

The elongated member 75 is formed in two parts, a leading part 75a and a trailing part 75b. At the junction of the two parts of the elongated member, there is provided a pair of mounting plates, being a leading mounting plate 81 which is connected to the leading part 75a of the elongated member and trailing mounting plate 83 which is connected to the trailing part 75b of the elongated member. The mounting plates 81 and 83 are arranged for face to face engagement and are adapted to be secured together by means of mounting bolts 85. A series of vertically spaced mounting apertures are provided adjacent each vertical side of each mounting plate 81 and 83 to allow the relative positions of the two plates to be adjusted vertically prior to insertion of the bolts 85. This allows the drawbar to be adjusted for connection to the mounting bar 17 of the agricultural machine regardless of the height of that mounting bar in relation to the mounting bar 19 of the seed drill attachment.

The sleeve member 77 is mounted on the trailing part 75b of the elongated member and a stop 87 is provided at the rear end of the elongated member to prevent withdrawal of the sleeve member from the elongated member.

A helical compression spring 89 is located on the trailing part 75b of the elongated member and acts between a stop 91 thereon and the sleeve member 77. The spring 91 biasses the sleeve member towards the rear end of the elongated member and cushions forward movement of the sleeve member 77 relative to the elongated member.

Operation of the seed drill attachment 11 will now be described. The seed drill attachment is attached to the mounting bar 17 of the agricultural machine by way of the drawbars 22. The stop 69 on the spring biassing means 55 is adjusted so as to compress the spring an amount corresponding to the required operating depth of the tool 27. As the combination of the agricultural machine and the seed drill attachment traverses the ground, the ground working points (not shown) at the bottom of the cultivator tynes 15 work the soil. The ground engaging tools 27 on the tynes 25 trail behind the ground working points and thus pass through worked soil. The biassing force exerted on the tynes 25 biassed the ground engaging tools 27 into engagement with the ground. Counteracting this is the resistive forces exerted on the ground engaging tools 27 as they pass through the worked soil. These counteracting forces control the depth at which the ground engaging tools 27 work. If the working depth of any one of ground engaging tools increases due to contours or other irregularities in the ground surface, the resistive forces on that tool increases which in turn causes the tyne to deflect rearwardly, so restoring the tool to the required working depth. If the working depth of any one of the ground engaging tools decreases, the resistive force on that tool also decreases and thus the biassing force exerted on the tyne becomes dominant with the result that the ground engaging tool is returned to the desired position. In this way, the ground engaging tools maintain the desired working depth irrespective of contours or other irregularities in the ground surface. Each ground engaging tool 27 digs into the ground forwardly of the associated seeding boot 29 to form a furrow for seed discharging from the seeding boot. The trailing harrow elements 72 cover the seeds.

As the agricultural machine traverses the ground, the spring loaded cultivated tynes 15 are deflected rearwardly because of resistive forces imposed on the ground working points at their lower ends by the soil. When the combination of the agricultural machine and the seed drill attachment stops, the spring force on the tynes 15 is normally sufficient to draw the agricultural machine rearwardly so as to release at least part of the spring force. The action of the drawbar permits this rearward movement of the machine without transmitting that movement to the seed drill attachment. More specifically, as the agricultural machine moves rearwardly the elongated member 75 of the drawbar slides within the sleeve 77 which is attached to the mounting bar 17 of the seed drill attachment. The compression spring 89 undergoes compression to cushion this movement. In this way, the rearward movement of the agricultural machine is not imposed on the seed drill attachment. Rearward movement of the seed drill attachment is undesirable because it may cause soil to be forced up into the outlet end of the seed boot 29 thereby causing a blockage.

It should be appreciated that the scope of the invention is not limited to the scope of the embodiment described.

I claim:

1. A seed drill, comprising: a mounting arm; a tyne, a pivotal connection means for pivotally connecting said tyne to said mounting arm for both angular movement about a substantially horizontal axis transverse to the direction of travel and for tilting movement relative to said horizontal axis about a longitudinally extending axis that is substantially perpendicular to said horizontal axis; a soil engaging tool secured to said tyne at the lower end thereof for forming furrow in the soil; a seeding boot secured rearwardly of said tool for discharging seed into the furrowed soil; said pivotal connection means comprising first spring biasing means interposed between said mounting arm and said tyne for urging said tool into engagement with the soil, said first spring biasing means including adjustment means for controlling the depth at which seeds are planted in the soil, said first spring biasing means exerting a force on said tyne which will counteract the resistive force on said tool as said tool traverses soil having different ground levels so as to provide a substantially constant planting depth, and second spring biasing means yieldably urging said tool into a normally upright position, said second spring biasing means being yieldable to permit said tyne to deflect and pivot about said longitudinally extending axis to allow said tool to pass around the surface of an obstruction as it furrows the soil.

2. The seed drill according to claim 1, wherein said tyne is pivotally connected to said mounting arm through a plate associated with said tyne, loose connection means connecting one end of said first spring biasing means to said plate to permit lateral deflection of said tool and the other end of said first spring biasing means being connected to said mounting arm.

3. The seed drill according to claim 2, wherein said mounting arm includes a shank which extends transversely through an aperture in said plate, and said second spring biasing means comprising a helical compression spring which is mounted on said shank and engaging said plate.

4. The seed drill according to claim 3, wherein said first spring means includes a push rod which extends generally along said mounting arm and a compression spring disposed on said push rod, and said adjustable means comprises an adjustable stop disposed on said push rod for controlling the length of said compression spring.

5. The seed drill according to claim 1, wherein said seed drill further includes a harrow tyne connected to said mounting arm such that a pair of spaced tyne elements extend rearwardly of said tool.

6. A seed drill assembly, comprising: a draw bar having first and second sections which are connected together for sliding movement in the direction of travel for said seed drill assembly, said draw bar including a spring for cushioning said sliding movement; a mounting bar secured to the trailing section of said draw bar, said mounting bar extending in a direction which is transverse to the direction of travel; a plurality of mounting arms attached to said mounting bar, each of said mounting arms extending from said mounting bar in the direction of travel; a plurality of tynes, pivotal connecting means for pivotally connecting each of said tynes to a respective one of said mounting arms for both angular movement about a substantially horizontal axis transverse to the direction of travel and for lateral movement about said horizontal axis; a soil engaging tool secured to each of said tynes at the lower end thereof for forming a furrow in the soil; a seeding boot secured rearwardly of each of said tools for discharging seed into the furrowed soil; said pivotal connecting means comprising first spring biasing means interposed between each of said mounting arms and said tynes for urging said tools into engagement with the soil, said first spring biasing means including adjustable means for controlling the depth at which seeds are planted in the soil, each of said first spring biasing means exerting a force on said tyne which will counteract the resistive force on said tool as said tool traverses soil having different ground levels so as to provide a substantially constant planting depth, and second spring biasing means compressively interconnecting each of said mounting arms with a respective one of said tynes for urging said tyne into a normally upright position, each of said second spring biasing means including a spring exerting a lateral force on said tyne holding said tyne in contact with a respective mounting arm while permitting said tyne to deflect laterally and allow said tool to pass to a side of and obstruction as it furrows the soil.

7. The seed drill assembly according to claim 6, wherein said draw bar is connected to a transversely extending mounting bar having a plurality of spring loaded stump jump action tynes connected thereto.

* * * * *